(12) United States Patent
Hahn et al.

(10) Patent No.: US 11,500,559 B2
(45) Date of Patent: Nov. 15, 2022

(54) SYSTEMS AND METHODS FOR CONFIGURING A DATA STORAGE DEVICE

(71) Applicant: Western Digital Technologies, Inc., San Jose, CA (US)

(72) Inventors: Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 14 days.

(21) Appl. No.: 16/898,119

(22) Filed: Jun. 10, 2020

(65) Prior Publication Data

US 2021/0389888 A1   Dec. 16, 2021

(51) Int. Cl.
*G06F 3/06* (2006.01)
*G06F 16/22* (2019.01)

(52) U.S. Cl.
CPC .......... *G06F 3/0632* (2013.01); *G06F 3/0604* (2013.01); *G06F 3/0673* (2013.01); *G06F 16/22* (2019.01)

(58) Field of Classification Search
CPC .... G06F 3/0632; G06F 3/0604; G06F 3/0673; G06F 16/22
See application file for complete search history.

(56) References Cited

U.S. PATENT DOCUMENTS

| | | | | |
|---|---|---|---|---|
| 2008/0158581 A1* | 7/2008 | Ferlitsch | ............... | G06F 3/1247 358/1.13 |
| 2013/0227347 A1* | 8/2013 | Cho | ................... | G06F 11/1068 714/15 |
| 2013/0238834 A1* | 9/2013 | Feldman | ............... | G06F 3/0671 711/103 |
| 2014/0359303 A1 | 12/2014 | Berke et al. | | |
| 2016/0048327 A1* | 2/2016 | Jayasena | ............. | G06F 13/1647 711/112 |
| 2016/0056847 A1* | 2/2016 | Wang | .................... | G06F 3/0619 455/127.1 |
| 2019/0146943 A1* | 5/2019 | Fender | .................... | G06F 30/34 710/105 |
| 2019/0238558 A1* | 8/2019 | Chaganti | ............. | G06F 11/2247 |
| 2020/0151134 A1 | 5/2020 | Helmick et al. | | |
| 2020/0159441 A1* | 5/2020 | Mayer | ...................... | G11C 5/14 |
| 2021/0081135 A1* | 3/2021 | Troy | .................... | G06F 3/0604 |

FOREIGN PATENT DOCUMENTS

CN          106997296 A      8/2017

OTHER PUBLICATIONS

PCT/US2020/066120, International Search Report and Written Opinion dated Feb. 14, 2021, 10 pages.

* cited by examiner

*Primary Examiner* — Ryan Bertram (74) *Attorney, Agent, or Firm* — Patterson & Sheridan, LLP; Steven H. VerSteeg (57) ABSTRACT

The present disclosure generally relates to systems and methods by which a data storage device may receive data about the host system in which it is installed, and the customer associated with that system. Based upon this received data, the data storage device may modify its native operating parameters and custom functions to enable more optimal operation with the host system.

20 Claims, 5 Drawing Sheets

SYSTEMS AND METHODS FOR CONFIGURING A DATA STORAGE DEVICE

BACKGROUND OF THE DISCLOSURE

Field of the Disclosure

Embodiments of the present disclosure generally relate to a data storage device, and more particularly to configuration of a data storage device.

Description of the Related Art

Upon the manufacture of a data storage device, each device is provided with a default configuration. In order to prepare the device for sale to a particular customer, the device is typically configured for that customer's needs, that depend upon host systems sold by that customer (i.e., an OEM customer), or in the case of the retail customer, a generic configuration. The configuration can comprise two types of configuration, a 'quirk' configuration that adjusts native operating parameters of the storage device relative to a host computer system in which the storage device is installed, and a 'persona' that configures the device with additional functionality beyond native operating parameters. Personas can include custom functionality such as use of an opcode in a particular manner, power loss notification, QoS requirements, thermal thresholds that are not standard for a device, timeout values, and the like, typically relevant to a particular OEM customer.

Although many storage device manufacturers provide these configurations on storage devices they sell to their customers, problems may arise when such a device is used on a different host, or moved to a host system of a different OEM customer. In prior approaches, storage devices that are used in different hosts, or with different customers, than the drive was originally intended, the quirks and personas did not match well the host systems. This results in sub-optimal performance, or in some cases, an inability for the storage device to operate in the new host system.

What is needed are systems and methods by which a data storage device may obtain information about a host system in to which it is installed, and the customer related to that host system, so that it may self-configure for operation in that host.

SUMMARY OF THE DISCLOSURE

The present disclosure generally relates to systems and methods by which a data storage device may receive data about the host system in which it is installed, and the customer associated with that system. Based upon this received data, the data storage device may modify its native operating parameters and custom functions to enable more optimal operation with the host system.

In one embodiment, a data storage device includes a controller that includes a data storage device operating parameter configured to configure a native function of the data storage device, where the controller is configured to receive a host identifier from a host. The data storage device further includes a database that includes a plurality of host identifier data elements and a plurality of device configuration data elements, where each of the plurality of device configuration data elements corresponding to a respective one of the plurality of host identifier data elements. The controller is further configured to obtain the host identifier from the host, match the host identifier to one of the plurality of host identifier data elements, and write a corresponding one of the plurality of device configuration data elements to the data storage device operating parameter.

In another embodiment, a data storage device includes a controller that includes a custom configuration memory configured to configure non-native functionality of the data storage device, where the controller is configured to receive a customer identifier from a host. The data storage device further includes a database that includes a plurality of customer identifier data elements and a plurality of custom configuration data elements defining non-native functionality of the data storage device, where each of the plurality of custom configuration data elements corresponding to a respective one of the plurality of customer identifier data elements. The controller is further configured to obtain the customer identifier from the host, match the customer identifier to one of the plurality of customer identifier data elements, and write a corresponding one of the plurality of non-native configuration data elements to the custom configuration memory.

In another embodiment, a data storage device includes a data base that includes a plurality of host identifier data elements, a plurality of customer identifier data elements, a plurality of custom configuration data elements, each of the plurality of custom configuration data elements corresponding to a respective one of the plurality of customer identifier data elements, and a plurality of operating parameter configuration data elements, each of the plurality of operating parameter data elements corresponding to a respective one of the plurality of host identifier data elements. The data storage device further includes a means for receiving a customer identifier from a host, a means for matching the customer identifier to one of the plurality of customer identifier data elements, and a means for modifying a controller of the data storage device based on the custom configuration data element corresponding to the one of the plurality of customer identifier data elements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to systems and methods by which a data storage device may receive data about the host system in which it is installed, and the customer associated with that system. Based upon this received data, the data storage device may modify its native operating parameters and custom functions to enable more optimal operation with the host system.

Figure 1:
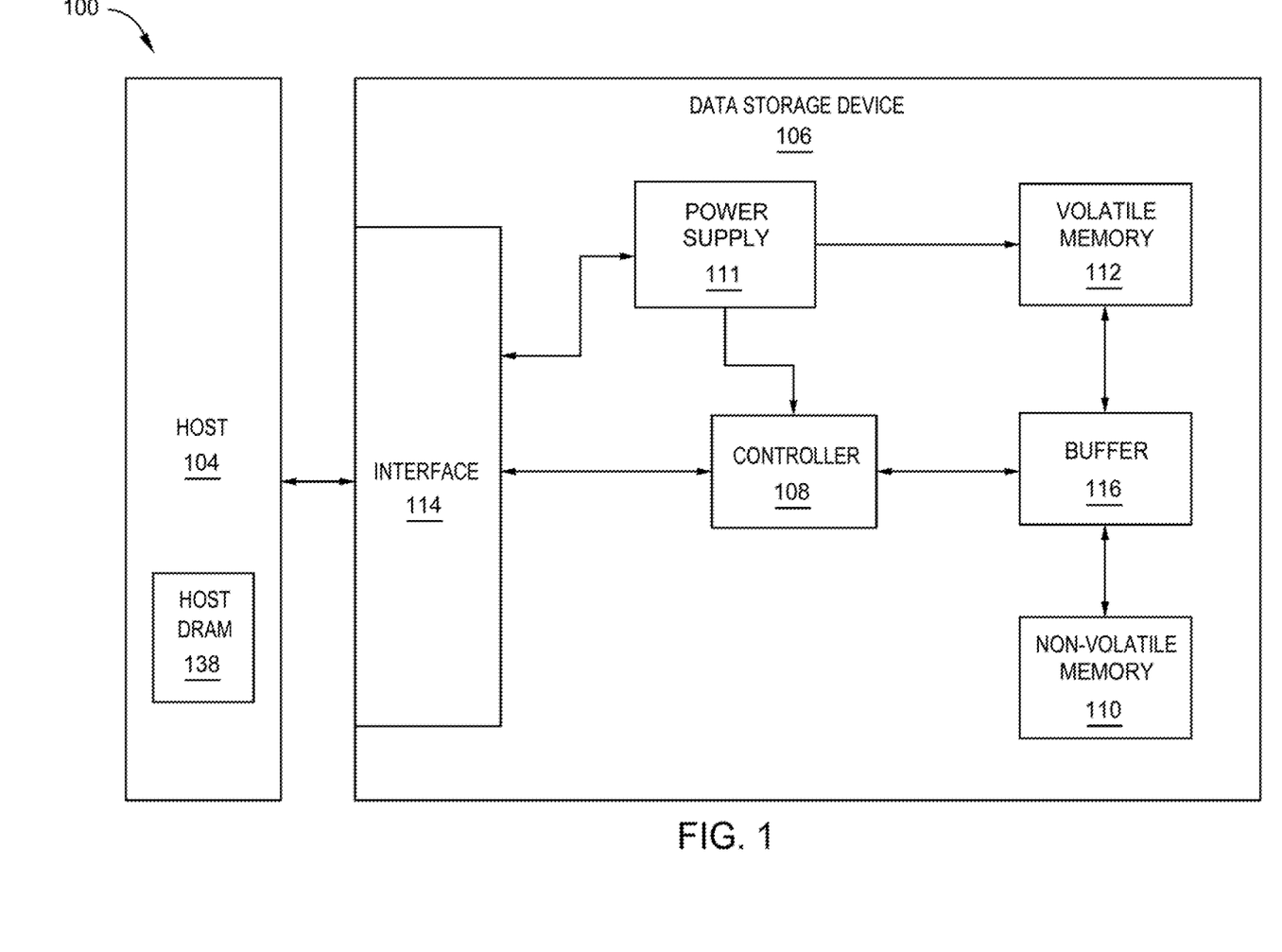
FIG. 1 is a schematic illustration of a computing system including a host device and a storage device, according to disclosed embodiments.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory (NVM) 110, a power supply 111, volatile memory 112, an interface 114, and a buffer 116. The controller 108 comprises an internal memory or buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
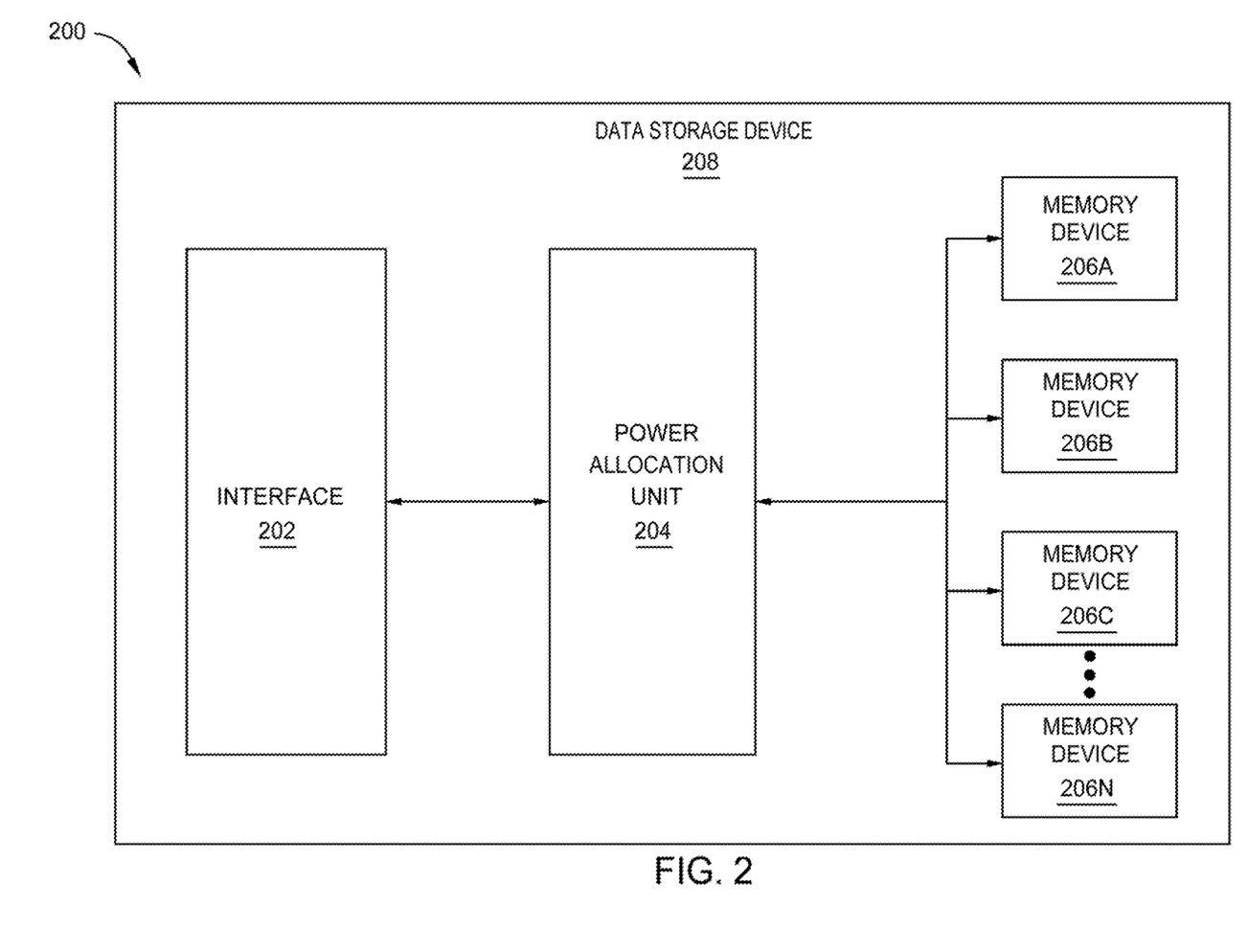
FIG. 2 is a schematic illustration of a data storage device, according to disclosed embodiments.

FIG. 2 is a schematic illustration of a data storage device 208, according to one embodiment. Data storage device 208 comprises an interface 202 and a power allocation unit (PAU) 204. The interface 202 may be the interface 114 of FIG. 1. The data storage device 208 further comprises an array of memory devices 206A-206N (collectively referred to as memory devices 206). The notation "N" refers to the last memory device of a plurality of memory devices. Furthermore, the memory devices 206 may be the non-volatile memory 110 of FIG. 1 or an NVMe storage device. Each of the memory devices 206A-206N may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). However, the listed data storage size of the memory devices is not intended to be limiting nor restricting. Furthermore, in one embodiment, memory devices 206A-206N are the same type and have the same data storage sizes. In another embodiment, memory devices 206A-206N are different types but have the same data storage sizes. In yet another embodiment, memory devices 206A-206N are different types and have different data storage sizes.

The power allocation unit 204 may be coupled with a controller (not shown), such as the controller 108 of FIG. 1. The PAU 204 appropriates power received from the host device, such as the host device 104 of FIG. 1, to each of the memory devices 206. The controller 108 may determine the appropriate power state of each memory device 206A-206N, and the PAU 204 provides the corresponding power to each memory device 206A-206N.

The host device 104 may provide a suitable amount of power to the data storage device 208 through one or more pins on the interface 202. The suitable amount of power may be more than or equal to the amount of power the data storage device 208 requires to operate. For example, the power a data storage device 208 may receive from the host device 104 may be about 5 W. Furthermore, a data storage device 208 may draw out about 500 mW to about 15W of power from the host device 104. The previously mentioned values for power are not intended to be limiting, but to provide a reference.

A memory device 206A-206N may have several power states (PS). For example, a memory device 206A-206N may have the following 5 power states: PS0, PS1, PS2, PS3, and PS4. Each of the power states are associated with a distinct data storage device 208 operation. Power states PS0, PS1, and PS2 are considered operational power states, utilizing about 1 W to about 8 W of power, whereas power states PS3 and PS4 are considered non-operational power states, utilizing about 2 mW to about 50 mW of power. An operational power state refers to the ability of a host device, such as the host device 104 of FIG. 1, to communicate with a memory device 206A-206N of a data storage device 208.

Power states are numbered sequentially, where higher numbers represent lower power requirements and corresponding higher exit latencies. Furthermore, each power state has an associated power requirement and an exit latency. PS0 may require 4.5 W with the lowest exit latency. PS1 may require less power than PS0, such as 3 W, and may have an exit latency equal to or higher than the exit latency of PS0. PS2 may require less power than PS1 and may have an exit latency equal to or higher than the exit latency of PS1. PS3 may require less power than PS2 and may have an exit latency equal to or higher than the exit latency of PS2. PS4 may require less power than PS3, such as 5 mW, and may have an exit latency equal to or higher than the exit latency of PS3, such as 50 mW. The values for the power states and exit latencies are not intended to be limiting, but to provide an example of possible embodiments.

PS0 is referred to as a full operational state, where I/O commands are enabled and the device may generate interrupts. Interrupts in this context are a signal to the host that commands have been completed. Furthermore, power states PS1, PS2, PS3, and PS4 are considered low power states. Power states PS1 and PS2 are also operational states, however, PS1 and PS2 may have a lower functionality than that of PS0. Power states PS3 and PS4 are non-operational states have a power requirement less than that of the operational power states. Furthermore, memory devices 206 not used are placed in a non-operational power state PS4 to limit the idle power consumption to a minimal value.

In order for I/O commands to occur, the memory device 206A-206N is woken up and placed into power state PS0. The controller, such as the controller 108 of FIG. 1, utilizes the PAU 204 to change the power state of a memory device 206A-206N from PS0 a different power state dependent on the situation and on host commands. However, the controller 108 is able to utilize the PAU 204 to allocate the appropriate amount of power to place all power states PS1, PS2, PS3, and PS4 into power state PS0 when a full operational state is required.

Figure 3:
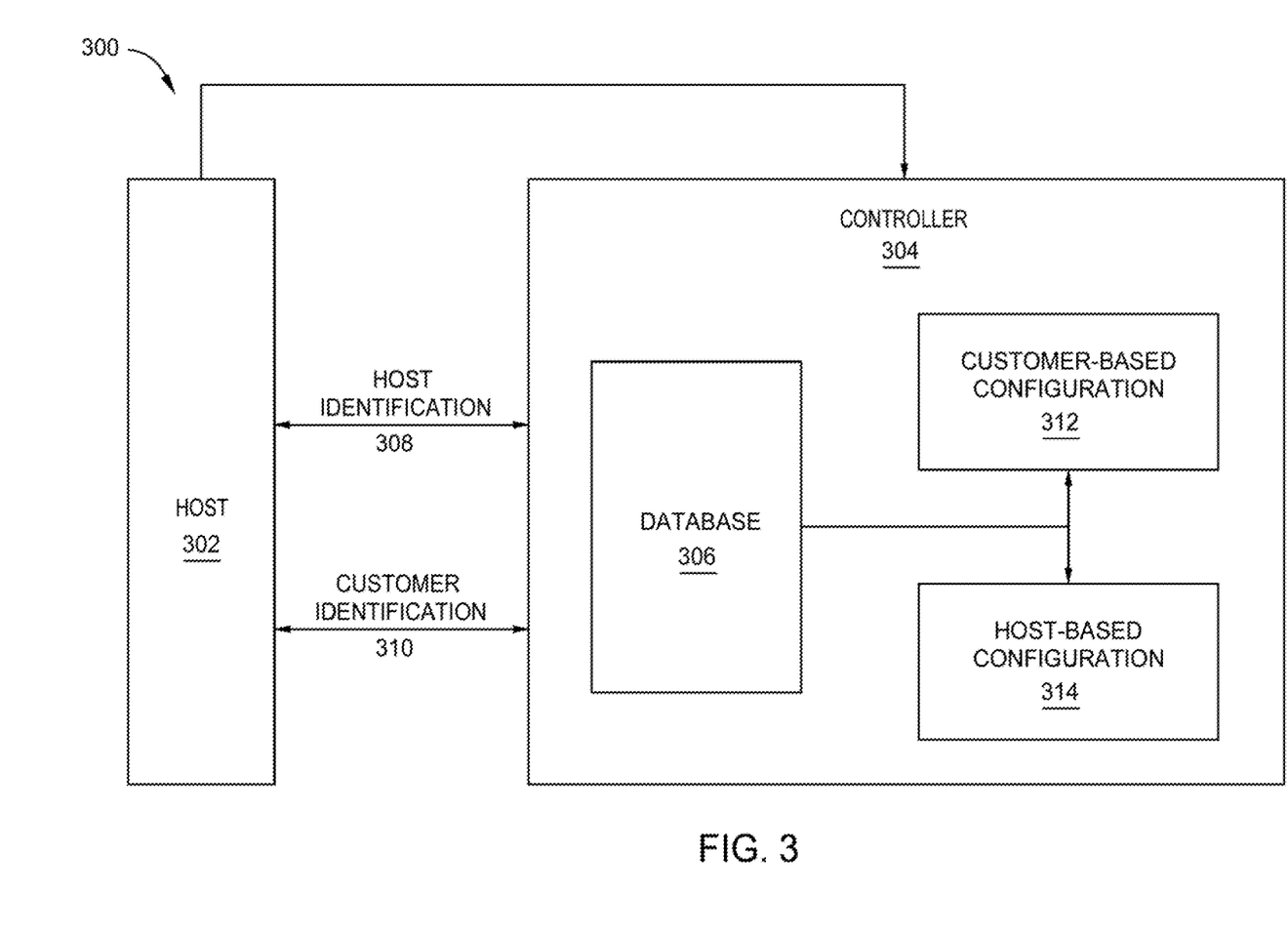
FIG. 3 depicts a host block diagram according to disclosed embodiments.

FIG. 3 depicts a system block diagram 300 according to disclosed embodiments. The system block diagram 300 includes a host 302 and a controller 304 of storage device, such as the storage device 106 of FIG. 1. The host 302 may be connected to the interface, such as the interface 114 of FIG. 1, of the storage device via a connection unit. The connection unit facilitates the transfer of data, such as read or write commands, and/or power between the host 302 and the storage device. The controller 304 receives the data from the host 302 and provisions system processing power to complete the host requests.

When the host 302 is connected to the storage device via the connection unit, a host identification signal 308 and a customer identification signal 310 is sent to the controller 304. In embodiments, the customer identification signal may be one or more of a manufacturer name, an asset tag, a host serial number or model number, or a vendor-defined unique value which identifies the customer. The storage device may be connected to different host, such that the controller 304 assigns a host ID to each individual host. For example, the host 302 of the system block diagram 300 may be assigned the host ID A by the controller 304. If the storage device is disconnected from the host 302 and connected to a second host, the controller 304 may assign the host ID B to the second host. The controller 304 recognizes each previous connection and associates each host with their respective host ID. However, if a connection is made between a new host (e.g., no previous connections between the host and the storage device), the controller 304 assigns a new host ID (e.g., a host ID that has not been assigned) to the new host. Furthermore, when the controller 304 receives the customer identification signal 310, the controller 304 is able to determine customer specifications for the controller internal parameter configuration. In one embodiment, the one or more hosts are associated with one customer. In another embodiment, the one or more hosts are each associated with one or more customers. In yet another embodiment, any number of the one or more hosts are each associated with one or more customers.

The controller 304 includes a database 306, where the database 306 includes a configuration table. The configuration table includes each host ID for and the host parameters associated with each host ID. The host parameter table below illustrates an example of the host parameters. The listed host parameters in the host parameter table below are not intended to be limiting, but to provide an example of a possible embodiment.

| Host Parameter Table | |
|---|---|
| Value | Definition |
| 07h | Host System Processor Model: The model of the CPU as a UTF-8 string. |
| 08h | Host Chipset Driver Version: The chipset driver version as a UTF-8 string. |
| 09h | Host Operating System Name and Build: The operating system name and build as a UTF-8 string. |
| 0Ah | Host System Product Name: The system product name as a UTF-8 string. |
| 0Bh | Host Firmware Version: The host firmware (e.g., UEFI) version as a UTF-8 string. |
| 0Ch | Operating System Driver Filename: The operating system driver filename as a UTF-8 string. |
| 0Dh | Display Driver Name: The display driver name as a UTF-8 string. |
| 0Eh | Display Driver Version: The display driver version as a UTF-8 string. |

When the host 302 and the storage device are connected via a connection unit, the controller 304 accesses the database 306 to access the relevant data associated with the host. An example of the configuration table of the database 306 is shown in the configuration table below. The configuration table may include portions of the host parameter table discussed above as well as other applicable options. Furthermore, the configuration table may have any number of columns, where the order of the columns (e.g., parameters) may be different in other embodiments.

| Configuration Table | | | | | |
|---|---|---|---|---|---|
| Host ID | PCIe TO | L0-L1 THR | Thermal THR | ... | ... |
| A | 5 mS | 100 μS | ... | ... | ... |
| B | 10 mS | 400 μS | ... | ... | ... |
| ... | ... | ... | ... | ... | ... |

In embodiments, the configuration table may include the above-indicated parameters and/or any one or more of vendor unique opcodes, max power in PS0, vendor unique log codes, enablement of optional PCIe features, critical temperatures, shut down temperatures, NVMe command timeouts, and/or host memory buffer size (e.g., max size).

In FIG. 3, when host 302 and the storage device have established a link, the controller 304 fetches the relevant entry associated with the host ID A from the database 306. After fetching the relevant entry, the controller 304 determines a customer-based configuration 312 and a host-based configuration 314 based on the parameters listed for the host 302. The customer-based configuration 312 and the host-based configuration 314 may include one or more quirks, where each quirk is a workaround to address known issues in a specific environment. The combination of one or more quirks may be unique to a specific host, such as the host 302. The controller configuration to accommodate a quirk may be a particular setting that is native to the device.

For example, a customer device (e.g., host) may have a requirement that a specific NVMe identification field be empty in the controller responses to the identify controller command, since this field is expected to remain empty in that host environment. In another example, the security functionality of the storage device is intentionally disabled when attached to a specific customer device. In the descriptions herein, the customer device is referred to as the host for exemplary purposes, such that the host is the host 302 of the system block diagram 300.

Unlike quirks, a persona is a non-native function or a custom function for the device, such as an additional added feature. An example of a persona may include a variety of features, such as the optional PCIe power loss notification feature, optional NVMe log pages, QoS (performance and trade-off), thermal thresholds, timeout values, low power timings, custom configurations, and possible workarounds. The listed features are not intended to be limiting, but to provide an example of an embodiment. It is contemplated that other features not listed may be applicable to a persona. The features listed above may be specific to one or more hosts.

The internal parameters of the controller 304 are configured based on the quirks and the persona. The customer-based configuration 312 is a controller configuration specified by the customer and the host-based configuration 314 is a controller configuration unique to the host device, where the host-based configuration 314 includes parameters that satisfy the customer-based configuration 312 requirements.

Figure 4:
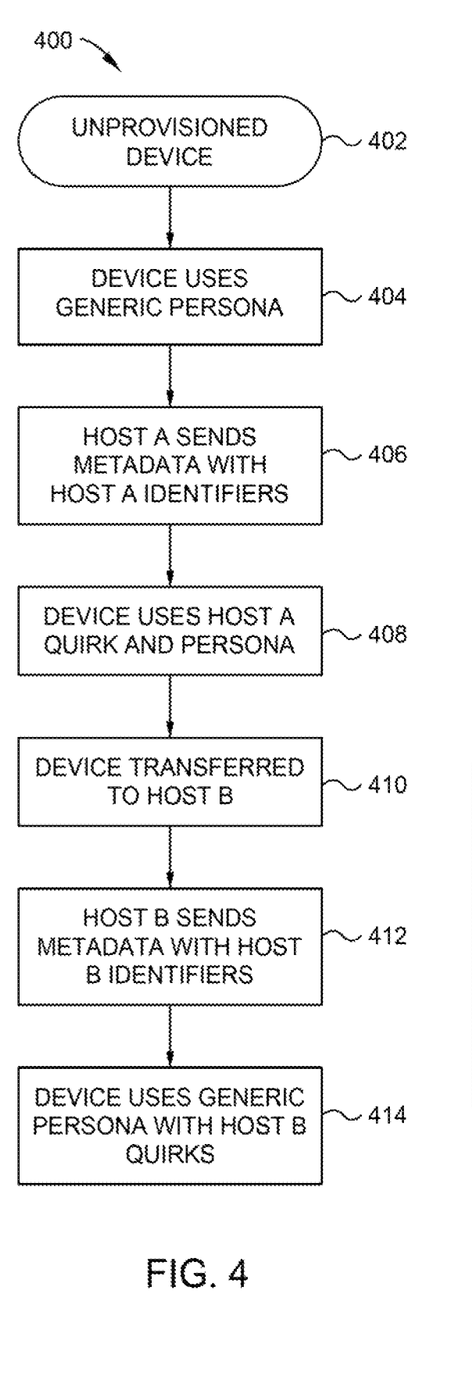
FIG. 4 depicts a flow diagram for modifying/customization of a storage device, according to disclosed embodiments.

FIG. 4 depicts a flow diagram 400 for modification/customization of a storage device, according to disclosed embodiments. The storage device may be the storage device 106 of Figure and/or the storage device 208 of FIG. 2. At block 402, the storage device is unprovisioned, such that the configuration table of the database, such as the database 306 of FIG. 3, does not have any entries. In one embodiment, the configuration table is empty. In another embodiment, the configuration table includes entries; however, the entries are for non-relevant configurations. At block 404, the controller, such as the controller 304 of FIG. 3, of the storage device is configured using a generic persona or a native persona.

At block 406, a first host, host A, is connected to the storage device via a connection unit. The host A sends metadata that includes host A identifiers to the controller of the storage device. The host A identifiers are stored in the configuration table of the database. At block 408, the internal parameters of the controller are configured to match the quirks and the persona of the Host A.

At block 410, the storage device is transferred to a second host, host B. At block 412, the host B sends metadata that includes host B identifiers to the controller of the storage device. The host B identifiers are stored in the configuration table of the database. The configuration table of the database includes both host A identifiers and host B identifiers. At block 414, the internal parameters of the controller are configured to match the quirks and the persona of the host B. If the storage device is transferred back to the host A, the controller, after the host identification signal is sent, fetches the relevant entry for the host A host ID in the configuration table of the database. The host ID A entry includes the quirks and persona for the host A. The internal parameters of the controller are configured to match the quirks and the persona of the relevant host ID entry. The controller may have logic to refrain from utilizing a persona that is not relevant to the host (e.g., the host and the persona are mismatched).

Figure 5:
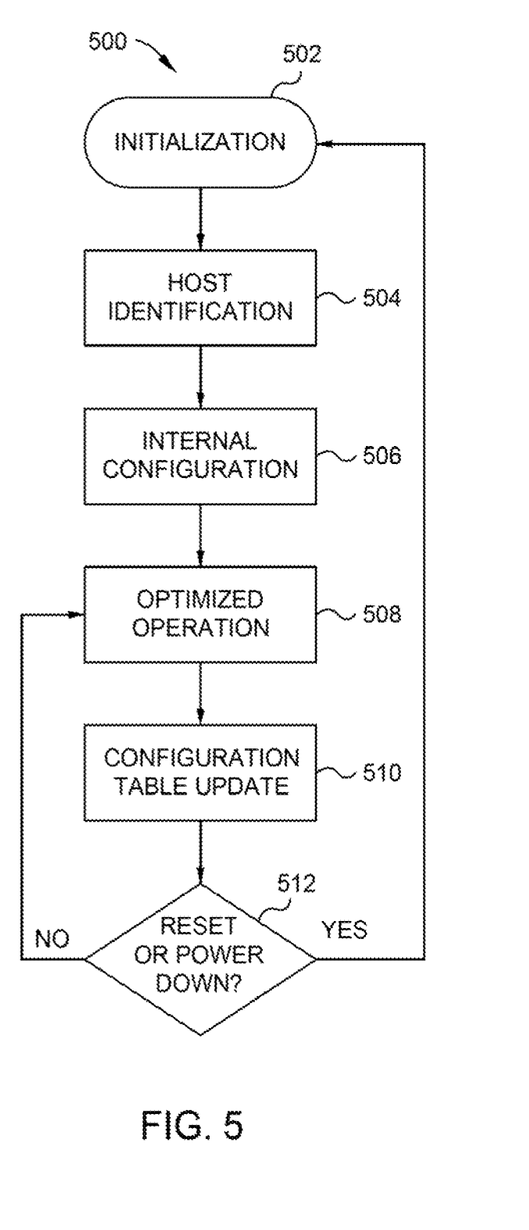
FIG. 5 depicts a flow diagram for configuration of a storage device, according to disclosed embodiments.

FIG. 5 depicts a flow diagram 500 for configuration of a storage device, according to disclosed embodiments. The storage device may be the storage device 106 of FIG. 1 and/or the storage device 208 of FIG. 2. At block 502, the connection between the host, such as the host 302 of FIG. 3, and the controller, such as the controller 304 of FIG. 3, of the storage device is initiated. At block 504, the host is identified via a host identification signal, such as the host identification signal 308 of FIG. 3. The controller accesses the internal database, such as the database 306 of FIG. 3, to fetch the relevant entry for the host ID associated with the host. The host identification may also include information from the host parameter table of FIG. 3.

At block 506, the internal parameters of the controller are configured based relevant host ID entry, such that the controller is optimized for the persona associated with the host. At block 508, the configuration table of the database is optimized based on the host configuration. The optimization of the relevant entry for a host may be done by artificial intelligence (AI) or simplified machine learning. At block 510, the configuration table is updated with the optimized results from the process at block 508. If the host and/or the storage device powers down or resets at block 512, the process restarts at block 502 with the initialization of the connection between the host and the storage device. However, if the host and the storage device both do not power down or reset at block 512, the configuration table is further optimized at block 508 and updated at block 510.

Figure 6:
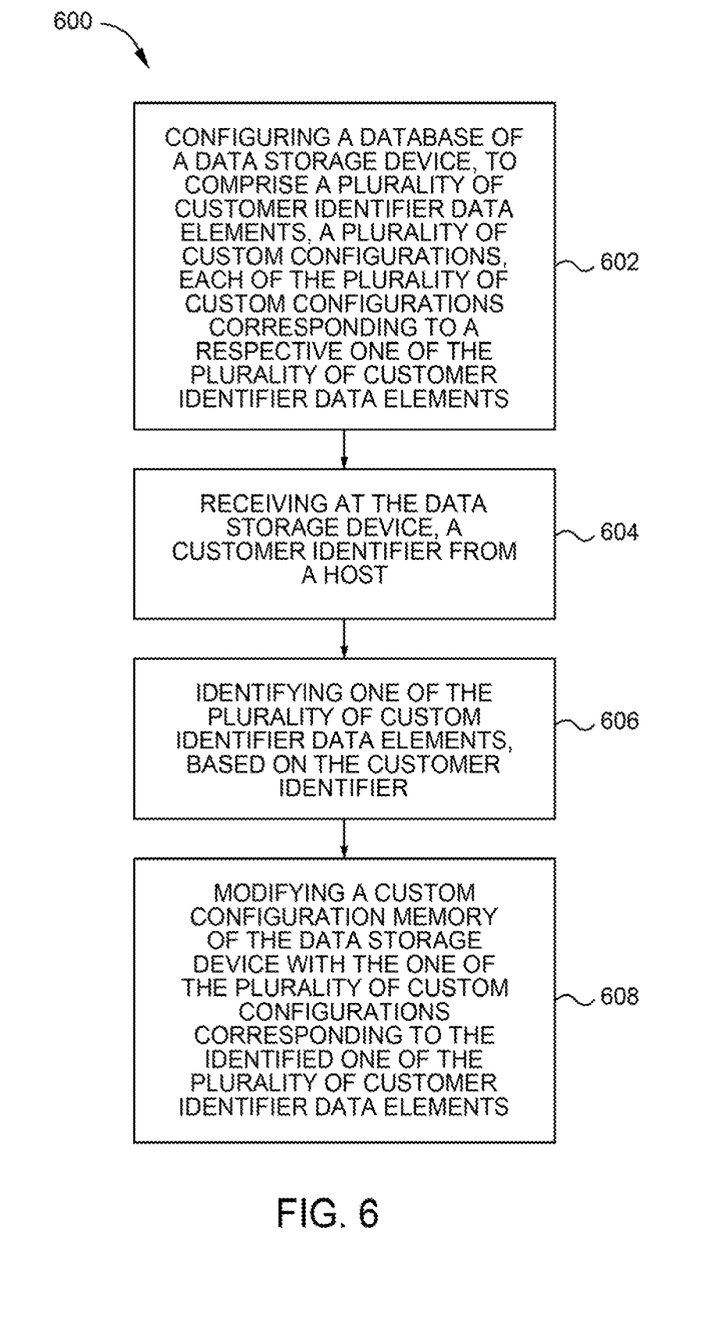
FIG. 6 depicts a method for configuration of a storage device, according to disclosed embodiments.

FIG. 6 depicts a method 600 for configuration of a storage device, according to disclosed embodiments. The storage device may be the storage device 106 of FIG. 1 and/or the storage device 208 of FIG. 2. At block 602, the controller, such as the controller 304 of FIG. 3, includes a database, such as the database 306 of FIG. 3, to include one or more customer identifier data elements and one or more custom configurations, where each configuration is a persona that includes one or more quirks. The one or more customer identifier elements correspond to one custom configuration of the one or more custom configurations. For example, the custom configuration associated with a host ID A is associated with only the host A (e.g., a customer A).

At block 604, the storage device receives a host identification signal, such that the host identification signal includes the customer identifier. The controller utilizes the customer identifier to identify which custom configuration will be applied to the controller at block 606. At block 608, the configuration table is updated with the custom configuration associated with the customer identifier for any customer identifier data elements missing or outdated.

By including a database that includes a configuration table that stores and updates the information for each host connection, the controller is able to fetch the relevant persona and configure the internal parameters of the controller to match the host specifications. Thus, the stability, the performance, the endurance, and the interoperability of the storage device is improved when the storage device is reused between one or more hosts.

In one embodiment, a data storage device includes a controller that includes a data storage device operating parameter configured to configure a native function of the data storage device, where the controller is configured to receive a host identifier from a host. The data storage device further includes a database that includes a plurality of host identifier data elements and a plurality of device configuration data elements, where each of the plurality of device configuration data elements corresponding to a respective one of the plurality of host identifier data elements. The controller is further configured to obtain the host identifier from the host, match the host identifier to one of the plurality of host identifier data elements, and write a corresponding one of the plurality of device configuration data elements to the data storage device operating parameter.

The controller is further configured to obtain a second host identifier from a second host, match the second host identifier to one of the plurality of host identifier data elements, and write a corresponding one of the plurality of device configuration data elements to the data storage device operating parameter. The controller includes a custom function memory configured to define a non-native function of the data storage device. The database further includes a plurality of customer identifier data elements and a plurality of custom configuration data elements, where each of the plurality of custom configuration data elements corresponding to a respective one of the plurality of customer identifier data elements. The controller is further configured to obtain the customer identifier, match the customer identifier to one of the plurality of customer identifier data elements, and write the corresponding one of the custom configuration data elements to the custom function memory. The host identifier is comprised of the customer identifier. The controller is configured to refrain from obtaining the host identifier after a power down of the host. The controller is further configured to refrain from matching a second customer identifier to one of the plurality of custom configuration data elements if the second customer identifier is different from the customer identifier. The controller is further configured to match a second customer identifier to one of the plurality of custom configuration data elements if the second customer identifier is different from the customer identifier.

In another embodiment, a data storage device includes a controller that includes a custom configuration memory configured to configure non-native functionality of the data storage device, where the controller is configured to receive a customer identifier from a host. The data storage device further includes a database that includes a plurality of customer identifier data elements and a plurality of custom configuration data elements defining non-native functionality of the data storage device, where each of the plurality of custom configuration data elements corresponding to a respective one of the plurality of customer identifier data elements. The controller is further configured to obtain the customer identifier from the host, match the customer identifier to one of the plurality of customer identifier data elements, and write a corresponding one of the plurality of non-native configuration data elements to the custom configuration memory.

The controller is further configured to obtain a second customer identifier from a second host, match the second customer identifier to one of the plurality of host identifier data elements, and write a corresponding one of the plurality of non-native configuration data elements to the custom configuration memory. The controller includes a data storage device operating parameter configured to configure a native function of the data storage device, where the controller is further configured to receive a host identifier from the host. The database further includes a plurality of host identifier data elements and a plurality of device configuration data elements, where each of the plurality of device configuration data elements corresponding to a respective one of the plurality of host identifier data elements. The controller is further configured to obtain the host identifier, match the host identifier to one of the plurality of host identifier data elements, and write the corresponding one of the device configuration data elements to the data storage device operating parameter. The host identifier includes the customer identifier. The controller is further configured to refrain from matching a second customer identifier to one of the plurality of custom configuration data elements if the second customer identifier is different from the customer identifier. The controller is further configured to write a default non-native configuration data element to the custom configuration memory if the second customer identifier is different from the customer identifier. The controller is configured to obtain the customer identifier after a power down of the host. The controller is further configured to match a second host identifier to one of the plurality of device configuration data elements if the second host identifier is different from the host identifier.

In another embodiment, a data storage device includes a data base that includes a plurality of host identifier data elements, a plurality of customer identifier data elements, a plurality of custom configuration data elements, each of the plurality of custom configuration data elements corresponding to a respective one of the plurality of customer identifier data elements, and a plurality of operating parameter configuration data elements, each of the plurality of operating parameter data elements corresponding to a respective one of the plurality of host identifier data elements. The data storage device further includes a means for receiving a customer identifier from a host, a means for matching the customer identifier to one of the plurality of customer identifier data elements, and a means for modifying a controller of the data storage device based on the custom configuration data element corresponding to the one of the plurality of customer identifier data elements.

The data storage device further includes a means for receiving a host identifier from the host, a means for matching the host identifier to one of the plurality of host identifier data elements, and a means for modifying the controller based on the operating parameter configuration data element corresponding to the one of the plurality of host identifier data elements. The data storage device also includes a means for receiving a second host identifier, a means for matching the second host identifier to one of the plurality of host identifier data elements, and a means for modifying the controller based on the second operating parameter configuration data element corresponding to the one of the plurality of host identifier data elements. The data storage device further includes a means for receiving a second customer identifier, a means for matching the second customer identifier to one of the plurality of customer identifier data elements, and a means for modifying the controller based on a second custom configuration data element corresponding to the one of the plurality of customer identifier data elements. One of the host identifier and the second host identifier includes one of a processor model, a chipset driver version, a product name, a firmware version, and a display driver version.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a controller comprising a data storage device operating parameter configured to configure a native function of the data storage device, the controller configured to receive a host identifier from a host; and
a database comprising:
a plurality of host identifier data elements; and
a plurality of device configuration data elements, each of the plurality of device configuration data elements corresponding to a respective one of the plurality of host identifier data elements; and
wherein the controller is further configured to:
obtain the host identifier from the host;
match the host identifier to one of the plurality of host identifier data elements;
write a corresponding one of the plurality of device configuration data elements to the data storage device operating parameters;
modify the data storage device operating parameter to match a quirk and a persona corresponding to the host, wherein the quirk corresponds to the native function of the data storage device and the persona corresponds to a non-native function of the data storage device, and wherein the non-native function is at least one of an optional PCIe power loss notification feature, an optional NVMe log pages feature, a QoS feature, a thermal thresholds feature, a timeout values feature, and a low power timings feature;
update a first device configuration data element of the plurality of device configuration data elements based on the quirk and the persona corresponding to the host; and
operate the data storage device based on the modified data storage device operating parameter.

2. The data storage device of claim 1, wherein the controller is further configured to obtain a second host identifier from a second host, match the second host identifier to one of the plurality of host identifier data elements, and write a corresponding one of the plurality of device configuration data elements to the data storage device operating parameter.

3. The data storage device of claim 1, wherein the controller comprises a custom function memory configured to define a non-native function of the data storage device; wherein the database further comprises a plurality of customer identifier data elements and a plurality of custom configuration data elements, each of the plurality of custom configuration data elements corresponding to a respective one of the plurality of customer identifier data elements; and wherein the controller is further configured to obtain the customer identifier, match the customer identifier to one of the plurality of customer identifier data elements, and write the corresponding one of the custom configuration data elements to the custom function memory.

4. The data storage device of claim 3, wherein the host identifier is comprised of the customer identifier.

5. The data storage device of claim 4, wherein the controller is configured to refrain from obtaining the host identifier after a power down of the host.

6. A data storage device, comprising:
a controller comprising a data storage device operating parameter configured to configure a native function of the data storage device, and a custom function memory configured to define a non-native function of the data storage device, wherein the controller is configured is to receive a host identifier from a host;
a database comprising:
a plurality of host identifier data elements;
a plurality of device configuration data elements, each of the plurality of device configuration data elements corresponding to a respective one of the plurality of host identifier data elements; and
a plurality of customer identifier data elements and a plurality of custom configuration data elements, each of the plurality of custom configuration data elements corresponding to a respective one of the plurality of customer identifier data elements; and
wherein the controller is further configured to obtain the host identifier from the host, match the host identifier to one of the plurality of host identifier data elements, write a corresponding one of the plurality of device configuration data elements to the data storage device operating parameter, obtain the customer identifier, match the customer identifier to one of the plurality of customer identifier data elements, write the corresponding one of the custom configuration data elements to the custom function memory, and refrain from matching a second customer identifier to one of the plurality of custom configuration data elements if the second customer identifier is different from the customer identifier.

7. A data storage device, comprising:
a controller comprising a data storage device operating parameter configured to configure a native function of the data storage device, and a custom function memory configured to define a non-native function of the data storage device, wherein the controller is configured is to receive a host identifier from a host;
a database comprising:
a plurality of host identifier data elements;
a plurality of device configuration data elements, each of the plurality of device configuration data elements corresponding to a respective one of the plurality of host identifier data elements; and
a plurality of customer identifier data elements and a plurality of custom configuration data elements, each of the plurality of custom configuration data elements corresponding to a respective one of the plurality of customer identifier data elements; and
wherein the controller is further configured to obtain the host identifier from the host, match the host identifier to one of the plurality of host identifier data elements, write a corresponding one of the plurality of device configuration data elements to the data storage device operating parameter, obtain the customer identifier, match the customer identifier to one of the plurality of customer identifier data elements, write the corresponding one of the custom configuration data elements to the custom function memory, and match a second customer identifier to one of the plurality of custom configuration data elements if the second customer identifier is different from the customer identifier.

8. A data storage device, comprising:
a controller comprising a custom configuration memory configured to configure non-native functionality of the data storage device, the controller configured to receive a customer identifier from a host; and
a database comprising:
a plurality of customer identifier data elements; and a plurality of custom configuration data elements defining non-native functionality of the data storage device, each of the plurality of custom configuration data elements corresponding to a respective one of the plurality of customer identifier data elements;

wherein the controller is further configured to:
obtain the customer identifier from the host, match the customer identifier to one of the plurality of customer identifier data elements;
write a corresponding one of the plurality of custom configuration data elements to the custom configuration memory;
modify the data storage device operating parameter to match a quirk and a persona corresponding to the host, wherein the quirk corresponds to the native function of the data storage device and the persona corresponds to a non-native function of the data storage device, and wherein the non-native function is at least one of an optional PCIe power loss notification feature, an optional NVMe log pages feature, a QoS feature, a thermal thresholds feature, a timeout values feature, and a low power timings feature;
update a first custom configuration data element of the plurality of custom configuration data elements based on the quirk and the persona corresponding to the host; and
operate the data storage device based on the modified data storage device operating parameter.

9. The data storage device of claim 8, wherein the controller is further configured to obtain a second customer identifier from a second host, match the second customer identifier to one of the plurality of customer identifier data elements, and write a corresponding one of the plurality of custom configuration data elements to the custom configuration memory.

10. The data storage device of claim 8, wherein the controller comprises a data storage device operating parameter configured to configure a native function of the data storage device, the controller further configured to receive a host identifier from the host; wherein the database further comprises a plurality of host identifier data elements and a plurality of device configuration data elements, each of the plurality of device configuration data elements corresponding to a respective one of the plurality of host identifier data elements; and wherein the controller is further configured to obtain the host identifier, match the host identifier to one of the plurality of host identifier data elements, and write the corresponding one of the device configuration data elements to the data storage device operating parameter.

11. The data storage device of claim 10, wherein the host identifier is comprised of the customer identifier.

12. A data storage device, comprising:
a controller comprising a custom configuration memory configured to configure non-native functionality of the data storage device, the controller configured to receive a customer identifier from a host;
a database comprising:
a plurality of customer identifier data elements; and
a plurality of custom configuration data elements defining non-native functionality of the data storage device, each of the plurality of custom configuration data elements corresponding to a respective one of the plurality of customer identifier data elements; and
wherein the controller is further configured to obtain the customer identifier from the host, match the customer identifier to one of the plurality of customer identifier data elements, write a corresponding one of the plurality of custom configuration data elements to the custom configuration memory; and refrain from matching a second customer identifier to one of the plurality of custom configuration data elements if the second customer identifier is different from the customer identifier.

13. The data storage device of claim 12, wherein the controller is further configured to write a default non-native configuration data element to the custom configuration memory if the second customer identifier is different from the customer identifier.

14. The data storage device of claim 13, wherein the controller is configured to obtain the customer identifier after a power down of the host.

15. The data storage device of claim 12, wherein the controller is further configured to match a second host identifier to one of a plurality of device configuration data elements if the second host identifier is different from the host identifier.

16. A data storage device, comprising:
a database means comprising:
a plurality of host identifier data elements;
a plurality of customer identifier data elements;
a plurality of custom configuration data elements, each of the plurality of custom configuration data elements corresponding to a respective one of the plurality of customer identifier data elements; and
a plurality of operating parameter configuration data elements, each of the plurality of operating parameter data elements corresponding to a respective one of the plurality of host identifier data elements;
a means for receiving a customer identifier from a host;
a means for matching the customer identifier to one of the plurality of customer identifier data elements;
a means for modifying a controller of the data storage device to match a quirk and persona corresponding to the host based on the custom configuration data element corresponding to the one of the plurality of customer identifier data elements, wherein the quirk corresponds to the native function of the data storage device and the persona corresponds to a non-native function of the data storage device, and wherein the non-native function is at least one of an optional PCIe power loss notification feature, an optional NVMe log pages feature, a QoS feature, a thermal thresholds feature, a timeout values feature, and a low power timings feature;
a means for updating a first custom configuration data element of the plurality of custom configuration data elements based on the quirk and the persona corresponding to the host; and
a means for operating the data storage device based on the means for modifying.

17. The data storage device of claim 16, further comprising:
a means for receiving a host identifier from the host;
a means for matching the host identifier to one of the plurality of host identifier data elements; and
a means for modifying the controller based on the operating parameter configuration data element corresponding to the one of the plurality of host identifier data elements.

18. The data storage device of claim 17, further comprising:
a means for receiving a second host identifier;

a means for matching the second host identifier to one of the plurality of host identifier data elements; and a means for modifying the controller based on the operating parameter configuration data element corresponding to the one of the plurality of host identifier data elements.

19. The data storage device of claim 18, further comprising:

a means for receiving a second customer identifier;

a means for matching the second customer identifier to one of the plurality of customer identifier data elements; and a means for modifying the controller based on a second custom configuration data element corresponding to the one of the plurality of customer identifier data elements.

20. The data storage device of claim 19, wherein one of the host identifier and the second host identifier comprises one of a processor model, a chipset driver version, a product name, a firmware version, and a display driver version.

* * * * *